Jan. 3, 1967 L. E. ALLEN 3,295,383
DRIVE BELT TIGHTENING IDLER MOUNTING
Filed Jan. 15, 1965

Inventor
Lawrence E. Allen
By Kenneth Tuckwitz
Attorney

United States Patent Office 3,295,383
Patented Jan. 3, 1967

3,295,383
DRIVE BELT TIGHTENING IDLER MOUNTING
Lawrence E. Allen, Independence, Mo., assignor to Allis-Chalmers Manufacturing Company, Milwaukee, Wis.
Filed Jan. 15, 1965, Ser. No. 425,781
14 Claims. (Cl. 74—227)

This invention relates generally to tension devices or tighteners for endless belts, chains or the like and is principally concerned with providing means for preventing a loss of tension in drives subjected to reversing loads and thus prevent drive slippage or complete loss of drive as a result of the driving element running off the driving or driven members. The main object of this invention is to provide a positive and reliable means for preventing a loss of belt tension when the drive is subjected to a reverse loading wherein the normally slack strand of the belt momentarily becomes the tight strand.

Reverse load conditions can take place as follows: When the drive is used to propel a vehicle powered by an internal combustion engine, power ordinarily would be transmitted through the belt from the driver sheave to the driven sheave when traveling on level ground or going uphill; however, when traveling downhill where the vehicle tends to coast, the engine would be used as a brake to prevent overspeeding of the vehicle. In this latter situation the power being transmitted would be in the reverse direction that is from the normally driven sheave to the driver sheave and causing tension in the normally slack strand to increase and tension in the normally tight strand to decrease. Suddenly reducing the engine speed of the vehicle would also cause a load reversal because of the momentum of the vehicle. A reversal in the direction of rotation of the drive would also cause a reversing load condition.

A further object of this invention is to provide means for readily maintaining tension in a driving belt but which means also provides for a limited amount of retrograde movement during periods of sudden surge or reverse loading.

A further object of this invention is to provide a latching mechanism in a belt tightening means which is quiet in operation.

A still further object of this invention is to provide an improved belt tightener of the character described which is of simple, low-cost design, easy to assemble, self-adjusting and easy to repair.

The foregoing and other important objects and desirable features inherent in and encompassed by the invention will become apparent as a preferred embodiment of the invention is completely disclosed in the following detailed description and accompanying sheet of drawings in which.

Figure 1:
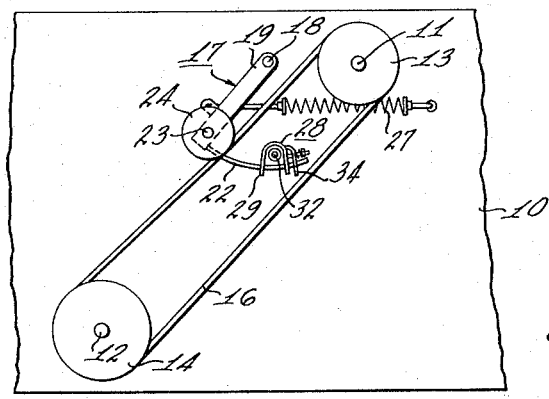
FIG. 1 is a side elevation of a machine having a member driven by an endless belt and being provided with a shiftable belt tightener constructed according to this invention.
Figure 2:
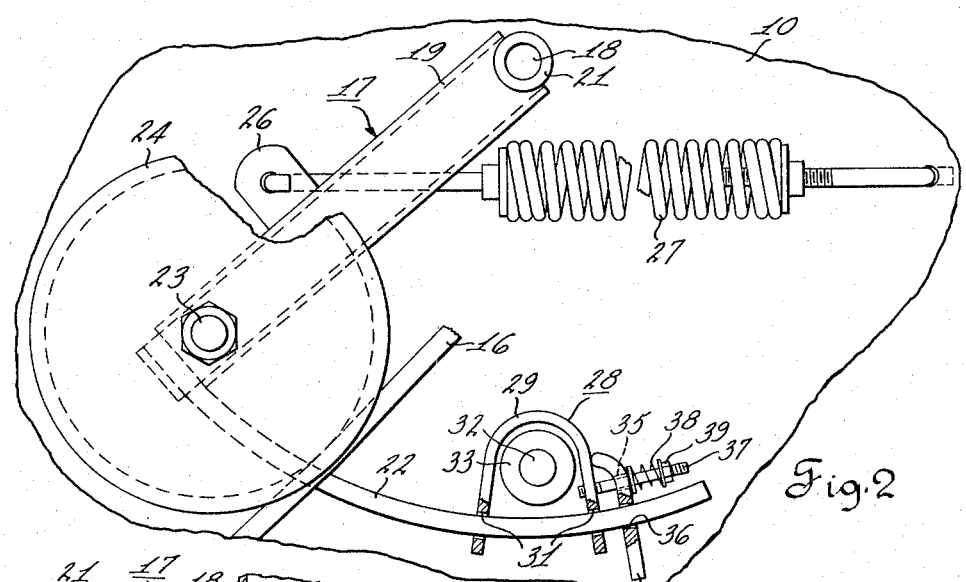
FIG. 2 is a fragmentary enlarged view similar to FIG. 1.

Referring now to the drawings by numerals of reference, and first to FIGS. 1 and 2, 10 denotes a framework of the type found in self-propelled combines. Rotatably mounted in such framework are driving shaft 11 and driven shaft 12 which have attached thereto driving sheave 13 and driven sheave 14, respectively. Extending around sheaves 13 and 14 is an endless flexible drive member or belt 16 held under desired tension by an adjustable idler sheave assembly 17. This assembly includes a support arm pivot shaft 18 attached to framework 10.

An idler support arm 19 is pivotally mounted at one end thereof on shaft 18 by means of a bushing member 21 attached to the upper end of support arm 19. Attached to the other end of arm 19 is an arcuate latch quadrant 22. Also attached adjacent this other end of arm 19 is a stub shaft 23 upon which is rotatably mounted an idler sheave 24 which is retained on shaft 23 by conventional means. A midportion of arm 19 is provided with an attaching ear 26 for receiving one end of a tension spring 27 having its other end connected to framework 10. Spring 27 biases idler sheave assembly 17 so that sheave 24 exerts a belt tightening function relative to the upper run of belt 16. The tension exerted by spring 27 is adjustable by conventional means.

A latch assembly 28 is mounted on arcuate member 22 and includes an inverted U-shaped latch guide 29 provided with openings 31 in the legs thereof for slidably receiving arcuate member 22. Within the bight of inverted U-shaped latch guide 29, an idler stop post 32 is received. This stop post is attached to framework 10 and is provided with a resilient cushion 33 mounted thereabout. An inverted L-shaped latch dog 34 is provided with an opening 36 (see FIG. 2) through which arcuate member 22 is received. The upper end of dog 34 is retained in contacting relation to inverted U-shaped member 29 by means of a stud 37 which is threadably engaged at one end with member 29 and which stud passes through an aperture 35 in dog 34. A spring 38 is positioned about stud 37 between dog 34 and a nut 39 threadably engaged with the other end of stud 37. Spring 38 biases the upper end of dog 34 into contact with latch guide 29.

Latch quadrant 22 has a configuration to form an arc of a circle the center of which coincides with the center of the support arm pivot shaft 18. Latch spring 38 provides a relatively light force for maintaining a slight frictional contact between latch dog 34 and the latch quadrant 22. Cushion 33 is provided to prevent wear and objectionable rattle on the occasion when the latch guide bears against the cushion.

From the foregoing, it can be seen that the latch quadrant 22 may be freely inserted and slid through the apertures in the latch guide 29 and latch dog 34 in one direction to tension belt 16, but an attempt to move the quadrant in an opposite direction to relieve the tension in belt 16 would cause an increase in the friction between the latch dog and quadrant thereby preventing movement of the quadrant in this direction and thereby preventing the loss of belt tension when reverse loads are encountered.

The use of a friction latch of the type illustrated is desirable because of its ability to relatch after almost infinitesimal amount of belt take-up, however, this ability can result in over tightening the belt under certain circumstances. For example, a sudden surge or overload can cause deflection of the structures momentarily and elongation of the belt within its elastic limit which would allow the idler to move to a tighter than normal position, where it would be latched.

To prevent this undesirable over tightening ability, a predetermined free travel of the idler is provided by means of clearance space between the latch guide 29 and the stop post cushion 33 and by providing a cushion member 33 made of resilient material such as rubber or the like.

From the foregoing, it is seen that the mechanism provided, readily takes up slack in belt 16 by permitting movement of sheave 24 in one direction but permits only a limited amount of retrograde movement of sheave 24 in the opposite direction i.e., until latch guide 29 is prevented from further retrograde movement by contact with stop post cushion 33.

As shown in FIG. 2, if belt stretch takes place quadrant 22 can readily move counterclockwise to maintain tension on belt 16. However, if a sudden reverse in the direction of power being transmitted by belt 16 should occur, then quadrant 22 would move in a clockwise direction about shaft 18 until the right hand leg of latch guide 29 contacted cushion 33. Any further movement of quadrant 22 after such contact would cause clockwise movement of dog 34 about its upper end thereby increasing the frictional engagement between dog 34 and quadrant 22 to the point of locking and thereby preventing further clockwise movement of quadrant 22. It is therefore seen that a limited amount of retrograde movement is provided in idler assembly 17 to take care of temporary reverse load conditions. When the reverse load condition has passed, spring 27 will cause assembly 17 to pivot slightly in a counterclockwise direction about shaft 18 until the left hand leg of inverted U-shaped member 29 contacts cushion 33 and the desired tension has been applied to belt 16. During this process dog 34 will be returned to a position of exerting a small amount of frictional force relative to belt tightening movement of quadrant 22.

Figures 3, 4:
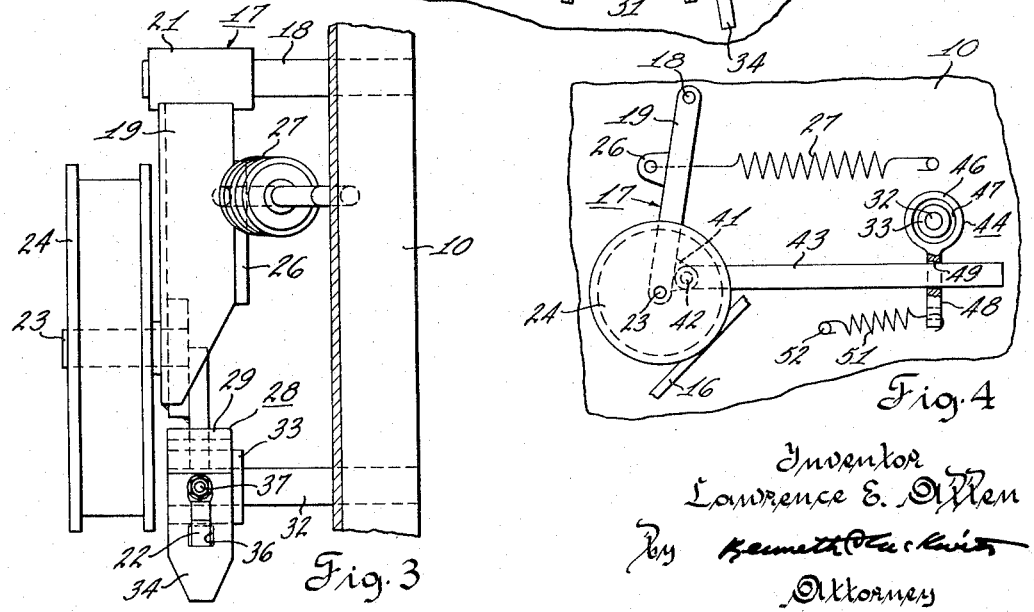
FIG. 3 is an end view of the mechanism shown in FIG. 2.
FIG. 4 is a side elevation of an additional embodiment of this invention.

Referring to FIG. 4 a further embodiment of this invention is seen. In this embodiment, reference numerals are used that are the same as the reference numerals used in the other figures when the same element is being designated. Framework 10 includes a support arm pivot shaft 18 attached thereto. An idler support arm 19 is pivotally mounted at one end on shaft 18 by means of a bushing member 21 attached to the upper end of support arm 19. Attached to the other end of arm 19 is an ear portion 41 which is provided with a pivot pin 42 for pivotally supporting one end of a rod 43 for vertical swinging movement thereabout. Also attached to this other end of arm 19 is a stub shaft 23 rotatably supporting an idler sheave 24. A midportion of arm 19 is provided with an attaching ear 26 for receiving one end of a tension spring 27 having its other end attached to framework 10. Spring 27 biases idler sheave assembly 17 so that sheave 24 exerts a belt tightening function relative to the upper run of belt 16. The tension of spring 27 is adjustable.

A latch 44 is mounted on rod member 43 and includes a circular portion 46 having an opening 47 receiving therein an idler stop post 32 carried by framework 10. A resilient cushion member 33 is mounted about stop post 32 between the stop post and the circular portion 46 of latch 44. Latch 44 is provided with a depending portion 48 provided with a slot 49 therein through which rod 43 passes. The lower portion of latch 44 has one end of a spring 51 connected thereto. The other end of spring 51 is connected to a pin 52 carried by framework 10. Spring 51 biases the lower end of latch 44 toward the left as viewed in FIG. 4 maintaining a slight frictional engagement between latch 44 and rod 43.

Rod 43 can be freely inserted and slid through aperture 49 in latch 44 but rod 43 will not move freely in the opposite direction. In other words, rod 43 will move freely to tension belt 16 but movement to lessen such tension by movement of rod 43 to the left is resisted by latch 44.

Movement of rod 43 and belt tightening sheave 24 to the left is prevented by latch 44 as follows: Spring 51 tends to pivot latch 44 clockwise about post 32 as does also the movement of rod 43 to the left and such clockwise movement of latch 44 increases the frictional engagement between latch 44 and rod 43 until a locking engagement therebetween is achieved. A certain amount of retrograde movement of rod 43 and sheave 24 takes place before this locking occurs and this is provided by the clearance between latch 44 and cushion 33, by the fact that cushion 33 is made of resilient material and by the clearance between aperture 47 and rod 43.

When slack occurs in belt 16, rod 43 and sheave 24 tend to move toward the right as biased by spring 27. Such movement causes latch 44 to pivot counterclockwise about post 32 until aperture 49 in latch 44 is so aligned with rod 43 that the friction therebetween is reduced to a point that relative movement is permitted and rod 43 slides through latch 44 until the present tension in spring 27 is again achieved against belt 16.

As shown in FIG. 4 if belt stretch takes place link and sheave 24 can readily move counterclockwise to maintain tension on belt 16. However, if a sudden reversal in the direction of power being transmitted by belt 16 should occur, then link 43 and sheave 24 would move in a clockwise direction about shaft 18 until the right hand portion of latch 44 contacted cushion 33. Any further movement of link 43 after such contact would cause clockwise movement of latch 44 about stop 32 thereby increasing the frictional engagement between the lower end of latch 44 and link 43 to the point of locking. Accordingly, it is seen that a limited amount of retrograde movement is provided in the latch assembly to take care of temporary overload conditions.

It should be understood that it is not intended to limit the invention to the specific structure herein shown and described for the purposes of illustration, as various modifications within the scope of the appended claims may occur to persons skilled in the art.

The embodiments of the invention in which an exclusive property or privilege is claimed are defined as follows:

1. In combination with a flexible driving means operatively connecting one or more rotary driven members with a rotary driving member and with said rotary members being carried by a framework, a drive tightening assembly including an arm mounted at one end on said framework for swinging movement about an axis parallel to the axes of said rotary members, a tightening member mounted on the other end of said arm for engagement with said flexible driving means, the improvement comprising, an arcuate element attached at one end to said other end of said arm, said arcuate element being so configured as to lie in a circle produced by said other end of said arm when said arm is rotated about said one end, latch means coacting with said arcuate member for permitting swinging movement of said arcuate member and said arm in one direction but limiting retrograde movement thereof, and resilient means operatively connected to said arm for biasing said tightening member in said one direction into engagement with said driving means for tensioning same.

2. The combination as recited in claim 1 wherein said latch means includes a latch dog carried on said arcuate member and coacting with a stop carried by said framework for limiting retragrade movement of said member.

3. The combination as recited in claim 2 wherein said latch means includes a latch guide carried by said arcuate member in surrounding relation to said stop and wherein said latch dog coacts with said latch guide relative to said arcuate member for limiting the retrograde movement of said drive tightening assembly to the clearance between said guide and said stop and to the compressibility of said stop.

4. The combination as recited in claim 3 wherein said latch dog permits free swinging movement of said drive tightening assembly in said tensioning direction.

5. A drive belt operatively connecting driver and driven members, said members being carried by a framework, a belt tightener including a belt engaging member pivotally mounted on said framework and biased to engage said drive belt to tension same, the improvement comprising latch means carried by said belt tightener for permitting free movement of said belt tightener in said biased direction and for permitting a limited degree of movement in the opposite direction when reversed load conditions are encountered.

6. In combination with a flexible driving means operatively connecting one or more rotary driven members with a rotary driving member with said rotary members being carried by a framework, a drive tightening assembly comprising an arm mounted at one end on said framework for movement about an axis parallel to the axes of said rotary members, a member mounted on the other end of said arm for engagement with said flexible driving means, an arcuate element attached at one end to said other end of said arm, said arcuate element being so configured as to lie in a circle produced by said other end of said arm when said arm is rotated about said one end, and inverted U-shaped latch guide slidably received on said arcuate element, a one-way latch dog slidably received on said arcuate element adjacent to said U-shaped latch guide, means biasing said latch dog toward said U-shaped latch guide, a stop post carried by said framework and positioned within the bight of said U-shaped latch guide for limiting the movement thereof, said stop being provided with a resilient cover forming a cushion between said post and said U-shaped latch guide, and resilient means biasing said member into engagement with said flexible means and toward said U-shaped latch guide, said latch dog permitting free swinging movement of said arcuate element in said biasing direction and limiting movement thereof in the opposite direction.

7. In combination with a flexible driving means operatively connecting a rotary driven member with a rotary driving member and said rotary members being carried by a framework, a drive tightening assembly including an arm mounted at one end on said framework for swinging movement about an axis parallel to the axes of said rotary members, a member mounted on the other end of said arm for engagement with said flexible driving means, the improvement comprising, a rod pivotally attached at one end to said other end of said arm, latch means coacting with said rod for permitting swinging movement of said rod and said arm in one direction but limiting retrograde movement thereof, and resilient means operatively connected to said arm for biasing said tightening member in said one direction into engagement with said driving means for tensioning same.

8. The combination as recited in claim 7 wherein said latch means coacts with a stop carried by said framework for limiting retrograde movement of said member.

9. The combination as recited in claim 8 wherein said latch means is carried by said rod in surrounding relation to said stop and wherein said latch coacts with said rod and said stop for limiting the retrograde movement of said drive tightening assembly to the clearance between said latch and said stop and to the clearance between said latch and said rod and to the compressibility of said stop.

10. In combination with a flexible driving means operatively connecting a rotary driven member with a rotary driving member with both rotary members being carried by a framework, a drive tightening assembly comprising an arm mounted at one end on said framework for movement about an axis parallel to the axes of said rotary members, a tension applying member mounted on the other end of said arm for engagement with said flexible driving means, a rod pivotally attached at one end to said other end of said arm, a one-way latch slidably received on said rod and having a bight portion, means biasing said latch toward said arm, a stop post carried by said framework and positioned within said bight portion for limiting the movement thereof, said stop being provided with a resilient cover forming a cushion between said post and said latch bight, and resilient means biasing said tension applying member into engagement with said flexible means and toward said latch, said latch permitting free swinging movement of said rod in said biasing direction and limiting movement thereof in the opposite direction.

11. In combination in a belt drive used to transmit power from a driver sheave to one or more driven sheaves, a frame structure supporting said sheaves for rotary motion, a belt engaging said sheaves, an idler sheave and support carried by said frame structure to allow free movement of said idler towards and away from the normally slack strand of said belt, biasing means attached to said frame structure and to said idler support for urging said idler sheave to bear on said strand with sufficient force to tension said belt to a value preventing belt slippage on said driver and driven sheaves while power in the normal direction is being transmitted by said belt, the improvement comprising said biasing means being controlled to tension said belt to substantially a constant value as said belt elongates as a result of wear, a one-way latching means connecting said idler support to said frame structure for allowing free idler movement in the belt tightening direction, and to automatically control idler movement in the opposite direction to a consistent predetermined amount.

12. The combination as recited in claim 11 and wherein said one-way latching means also aperates to automatically reset after any increment of belt wear, and said latch means also operates after each reset to continue control of idler movement in the belt relaxing direction to the same amount from the newly established point as it did from the previous point.

13. The combination as recited in claim 11 and wherein said one-way latching also operates to allow free movement of said idler sheave in the belt tightening direction to maintain tension in said belt as deflection within the elastic limit occurs during the period that the amount of power being transmitted is increasing to the maximum, said latching means also operating to allow free movement of said idler sheave in the opposite direction to relieve strain on said belt as the amount of power being transmitted is being reduced, said latching means being so constructed and arranged that after a predetermined and consistent amount of idler sheave movement in the belt relieving direction said latch means operates to prevent further idler movement in said relieving direction, thereby retaining sufficient belt tension to transmit power in the reverse direction.

14. The combination as recited in claim 13 and wherein said one-way latching means also operates to automatically reset after any increment of belt wear when said idler sheave advances in the belt tightening direction beyond a point previously reached, said latch means also operates after each reset to continue control of idler movement in the belt relaxing direction to the same amount from the newly established point as was permitted from previous points.

References Cited by the Examiner

UNITED STATES PATENTS

| 1,163,891 | 12/1915 | Caverno | 74—242.11 |
| 1,379,055 | 5/1921 | Smith | 74—242.11 X |
| 1,401,169 | 12/1921 | McCuen | 74—242.11 |
| 1,557,486 | 10/1925 | Valentine | 74—242.11 |

FOREIGN PATENTS

| 214,025 | 3/1958 | Australia. |
| 279,415 | 3/1952 | Switzerland. |

DAVID J. WILLIAMOWSKY, *Primary Examiner.*

J. A. WONG, *Assistant Examiner.*